United States Patent [19]

Christiano

[11] Patent Number: 5,386,369

[45] Date of Patent: Jan. 31, 1995

[54] LICENSE METERING SYSTEM FOR SOFTWARE APPLICATIONS

[75] Inventor: Matthew Christiano, Saratoga, Calif.

[73] Assignee: Globetrotter Software Inc., Cupertino, Calif.

[21] Appl. No.: 89,834

[22] Filed: Jul. 12, 1993

[51] Int. Cl.⁶ ............................................. G06F 15/20
[52] U.S. Cl. ................................................ 364/464.01
[58] Field of Search ..................... 364/464.01, 464.02, 364/561; 377/15

[56] References Cited

U.S. PATENT DOCUMENTS

| | | | |
|---|---|---|---|
| 2,721,701 | 10/1955 | Hardesty et al. | 377/15 X |
| 3,344,408 | 9/1967 | Singer et al. | 377/15 X |
| 4,447,890 | 5/1984 | Duwel et al. | 364/464.02 |
| 4,710,888 | 12/1987 | Burke et al. | 364/561 |
| 4,803,646 | 2/1989 | Burke et al. | 364/561 |
| 5,181,245 | 1/1993 | Jones | 364/464.02 X |
| 5,202,914 | 4/1993 | Kim et al. | 379/97 |
| 5,233,531 | 8/1993 | Schulz | 364/464.02 |

OTHER PUBLICATIONS

Brochure Entitled: MicroSentinelUX TM by Rainbow Technolgies.

Primary Examiner—Edward R. Cosimano
Attorney, Agent, or Firm—Hickman & Beyer

[57] ABSTRACT

An improved software metering system is disclosed. In one embodiment the metering system is in a hardware based "dongle" style meter that plugs into a port of the computer system on which the metered software is running, in software with the metering information being stored on the computer's non-volatile memory or even on a remote location that is attached to the computer system via a network. The disclosed invention utilizes a system of pointers and counter slots in order to prevent the loss of metering information due to non-volatile read/write memory wear out. Also, the invention utilizes a data structure of virtual counters and pointers to be able to keep track of numerous pieces of software with only one meter. The system is also capable of being updated and remotely without compromising meter security with the inclusion of an update code in the data structure. Both methods and apparatus for accomplishing these functions are disclosed.

27 Claims, 7 Drawing Sheets

LICENSE METERING SYSTEM FOR SOFTWARE APPLICATIONS

BACKGROUND OF THE INVENTION

The present invention relates generally to a software metering system suitable for monitoring and/or controlling the usage of software applications.

Software piracy has long been a problem that has plagued software developers. Accordingly, a variety of protection schemes have been developed. One approach is to use a hardware key that plugs into a parallel port at the back of a computer to monitor the usage of selected software running on that machine. Representative hardware keys (also sometimes referred to as dongles in the trade) are marketed by RAINBOW Technologies of Irvine, Calif. Such hardware keys may plug into a standard port such as a RS-232 parallel port. The Rainbow hardware key is understood to contain an 8-bit microprocessor with 32 bytes of non-volatile read-/write memory. When developers integrate the use of hardware keys into their software, the keys can be used for a variety of purposes including controlling distribution, software leasing and site license management.

One problem that has been seen in conventional metering devices memory stems from the relatively short life span of the memory devices used therein. To function effectively in software leasing control applications, a meter must have some sort of non-volatile memory that can be frequently rewritten. In external devices such as hardware keys, EEPROMs are normally used as the non-volatile memory. The drawback of EEPROMs stems from their life span which is typically only in the range of 10,000 to 50,000 write/erase cycles. However, such a short life span is often far too short for counter applications. Therefore, metering devices having EEPROM counters have had limited commercial success. The reason is that if a counter goes bad, the user and the licenser may have lost substantially all of the meter's information.

Another problem that has been encountered with existing hardware key based metering devices is that they are not well suited for updating from remote locations. Accordingly, it is desirable for the metering system to be arranged to permit the vendor to remotely add value to the meter.

SUMMARY OF THE INVENTION

To achieve the foregoing and other objects and in accordance with the purpose of the present invention, an improved software metering system is disclosed. The meter may be embodied in a hardware based meter that plugs into a port of the computer system on which the metered software is running, in software with the metering information being stored on the computer's non-volatile memory or even on a remote location that is attached to the computer system via a network.

Several independent features of the described meter are believed to be novel. One such feature is a mechanism for preventing wear out of the non-volatile memory used to store the metered data. A second feature is a mechanism for permitting the vendor and user to cooperate to remotely update a meter located at the user's site without compromising meter security. A third feature is a mechanism for permitting a single meter to be used by a variety of software applications. Both methods and apparatus for accomplishing these functions are disclosed.

In a preferred data structure for implementing various aspects of the invention, the meter includes non-volatile memory that is divided into a multiplicity of counters and slots. Each counter includes a storage location for a count slot pointer indicative of one of the slots. In other preferred aspects of the data structure, the counter may also include storage locations for an update code and a virtual counter number.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 1:
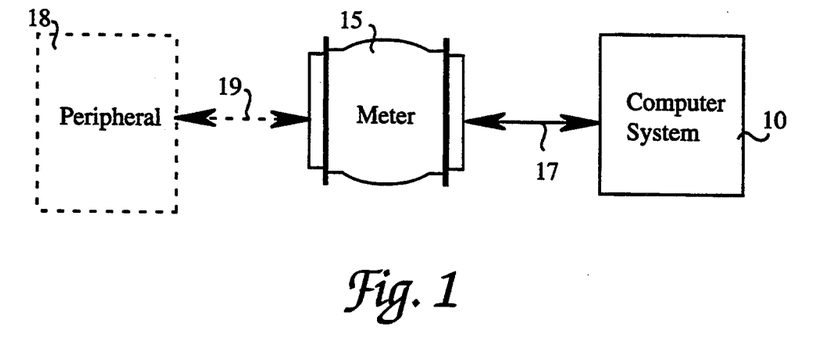
FIG. 1 is a schematic diagram of a computer system incorporating a software meter in accordance with the present invention.
Figure 2:
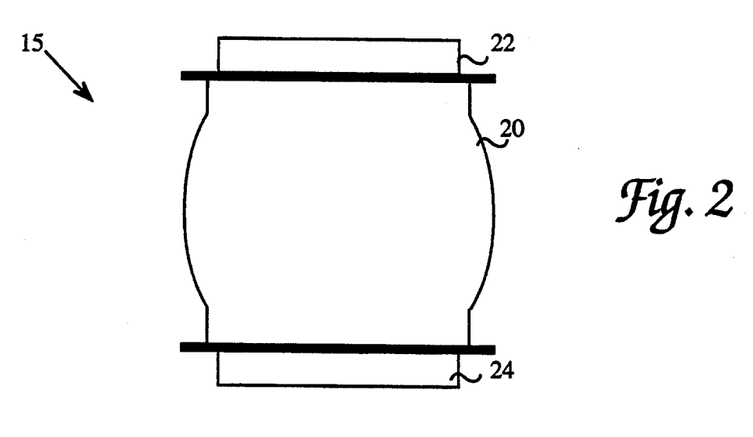
FIG. 2 is a top view of a meter suitable for coupling with a parallel port.
Figure 3:
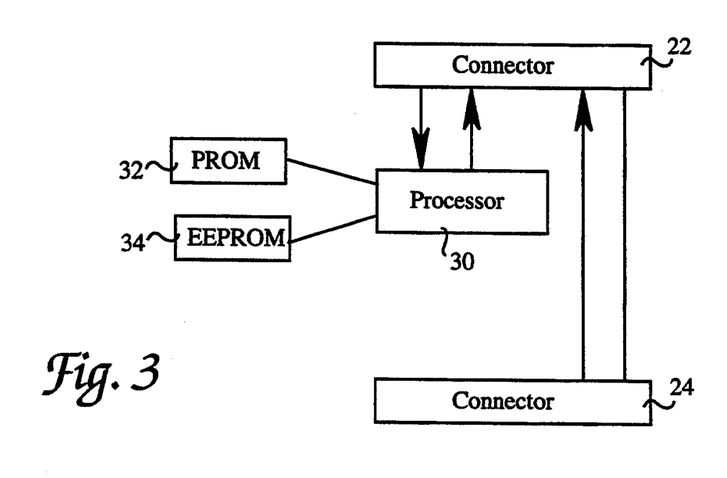
FIG. 3 is an electrical diagram of the meter shown in FIG. 2.

The present invention relates to software metering systems. Referring initially to FIGS. 1-3 a "dongle" style hardware key suitable for incorporating the present invention will be described. As seen therein, the meter 15 may be plugged directly into a parallel port 17 of a computer 10. The meter 15 has both female 22 and male 24 connectors and is arranged to pass signals directly between the connectors 22 and 24. Thus, the meter 15 has a transparent path 19 to any peripheral 18 that is plugged into the parallel port 17 through the meter 15. Although the described embodiment takes the form of a hardware key type meter 15 that plugs into a parallel port, the invention can just as readily be embodied in a variety of other forms. By way of example, it may be implemented as a hardware based meter attached directly to the computer system via a serial port; in software stored directly in the computer system's non-volatile memory; or at a remote location that is coupled to the computer system via a network.

The meter 15 includes a plastic casing 20 having connectors 22 and 24 at opposite ends. A processor 30 is housed within the casing 20 in communication with the connector 22 that couples the meter 15 to the parallel port 17. The processor can therefore communicate bidirectionally with the computer system 10. The meter also contains memory in the form of both PROM 32 and EEPROM 34. The PROM 32 is used to store the software necessary to operate the meter and the EEPROM 34 is used to store the meter's various count values which will potentially change with time. Of course, the PROM 32 could be replaced by any other type of non-volatile memory and serve the same purpose. Similarly, the EEPROM could be replaced by any other suitable non-volatile read/write memory.

As indicated above, one drawback of existing meters is the potential for memory wear out. Specifically, when a conventional EEPROM is repeatedly rewritten, it tends to lose its ability to hold a value after extended use. Therefore, the described meter is arranged to detect memory wear out in the counters. When such wear out is detected, the counter's location in memory is moved. This prevents loss of data by preserving the count and extends the effective life of the meter. By substantially eliminating the risk of data loss due to memory wear out, the described meter may be used in a variety of software licensing applications that have typically shunned the use of dongle type meters due to the memory wear out problems.

One attractive software licensing application for software metering devices is monitoring the amount that a leased application is used. To accomplish this, the meter is typically used something like a common postage meter. That is, the meter is set to a chosen value (which corresponds to the amount of usage that the user has paid for) and a counter (either count down or count up) is used to keep track of the actual program usage. When the actual usage equals or exceeds the value paid for, the meter prevents further use of the application until the meter is replenished (i.e. additional value is added to the meter).

The described meter 15 is arranged to permit the licensor/distributor to cooperate with the user to remotely add value to the meter without compromising the meter's security. More specifically, when a user wishes to add value to the meter, they simply call the software's vendor (or the vendor's representative) and inform them of how much additional value they wish to add to the meter. They also provide the vendor with the meter's serial number and an update code calculated by the meter. Knowing the serial number, the update code and the amount of value that the user wishes to add to the meter, the vendor runs an encryption program that determines an encrypted key that is unique to the specific transaction. The key may take the form of a character string. By way of example, suitable character strings include alphanumeric strings and numbers. The user then executes a meter control program that is provided with the meter. Within the meter control program, the user makes an "add value to the counter" request. The program is arranged to prompt the user to input the encrypted key provided by the supplier, as well as the counter number and the amount to be added to the meter. This information is passed to the meter's processor 30 which uses the same encryption algorithm to independently calculate the encrypted key. So long as the encrypted key calculated by the processor 30 and the encrypted key input by the user match, the addition of value is allowed. If the input and calculated keys do not match, the addition is not allowed.

In the described embodiment, the encryption algorithm used to calculate the key is a function of five variables. The first is the meter's serial number, the second is an update code, the third is an encryption seed number, the forth is the counter number of the counter to be updated and the fifth is the amount that the counter is to be incremented. The actual formula used to calculate the key may be widely varied. The important thing is that the formula not be obvious (or easily discernible) to users so that they can not readily determine the key. By way of example, a suitable formula might be:

$$\text{Key} = \text{MD5}(X)$$

Wherein "X" is the ASCII string created by concatenating the ASCII representations of the update code, the vendor seed number, the virtual counter number, the amount to be incremented, and the meter's serial number. MD5 is a well known message encryption algorithm supplied by RSA Data Security, Inc. of Redwood City, Calif.

The serial number is used in the formula to help insure that two users can not share information and both use the same information to increment their counters. The update code is a number that is calculated by the meter after each addition of value to the meter. Of course, the vendor's encryption algorithm is arranged to use the same formula to determine the update code used therein. The update code is varied after each increment to insure that the user does not use the same key to do repetitive updates. The seed number is used to further enhance security by insuring that the encryption is unique for each different vendor that may be using the meter. The counter number to be updated is used since it identifies the product to be updated. The amount to be added to the counter is used in order to help insure that the user does not add more value to the counter than they are entitled to.

The described method of securely adding value to a meter can be used in a variety of applications beyond simple software license meters. By way of example, it could be used to update postage meters or a wide variety of other meters remotely as well.

Another feature of the described meter is that it can be used to simultaneously monitor multiple different applications, even if the actual applications to be monitored are not known at the time that the meter is purchased. To accomplish this, each application that can be monitored using the meter is given a unique virtual counter number. The actual manner in which the virtual counter numbers are assigned may be widely varied in accordance with the needs of a particular situation. However, in one preferred arrangement, the virtual counter number would be unique for each software application. In software developed for widespread distribution, distinct virtual counter numbers would not be provided for each copy, rather, a single number would be provided for the application program as a whole. For customized software, distinct virtual counter numbers could be provided for each customer.

As can be appreciated by those familiar with software licensing, the potential number of programs that can make use of the described metering arrangement is very large. Therefore, it is quite likely that the total number of virtual counter numbers that are assigned will exceed the total number of physical counters in the meter. However, at the same time, so long as a reasonable number of counters are provided in the meter's memory, it is unlikely (although possible) that any particular user will have more licensed software than counters. Therefore, a mechanism is provided in the data structure that allows any particular physical counter to be assigned any virtual counter number. In this manner, the meters can be standardized and do not require that they be customized to a particular software package. When a monitoring event takes place in a particular software application, the application transmits the virtual counter number together with an instruction as to what event has occurred. The meter then sequentially searches through its physical counters until it finds a counter associated with the designated virtual counter number. That counter is then modified in accordance with the instruction. By using virtual counter numbers, the number of programs that can be monitored using a single meter is greatly expanded and the meter may be readily used to monitor newly created software in addition to software that was in existence at the time the meter was produced.

Figure 4:
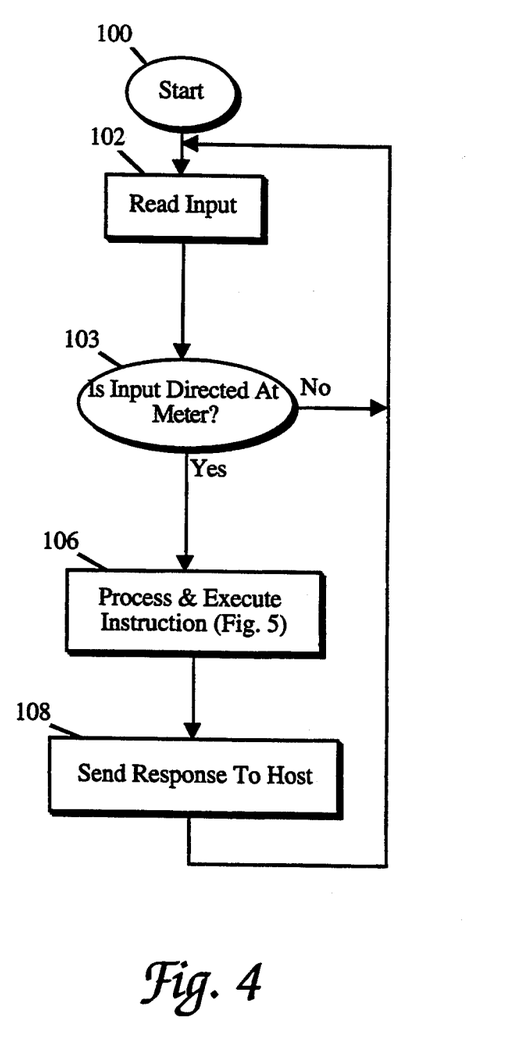
FIG. 4 is a flowchart illustrating a method of processing an instruction sent from a computer system to a meter.

Referring next to FIGS. 4-10, a method of processing instruction transmitted to a meter 15 in accordance with the present invention will be described. Turning first to FIG. 4, the process begins at step 100. In step 102, the input transmitted to the meter is read. Then in step 103, the processor 30 determines whether the input is directed to the meter. If not, the meter does nothing and does not interfere with the information being transmitted through the meter. This permits the meter to be used in series with a peripheral unit. That is, the meter 15 can be plugged into a port 17 of the computer system via connector 22. Then, the peripheral cable connector can be coupled to the second meter connector 24. Thus, the meter is effectively transparent to the peripheral devices that are coupled to the computer system through port 17. When the input is directed to the meter, the logic flows to step 106 where the instruction carried by the input is processed and executed. Thereafter in step 108, any suitable responses are transmitted back to the computer system indicating the appropriate status of the meter. The meter then returns to step 102 where it waits for the next input from the computer system.

Figure 5:
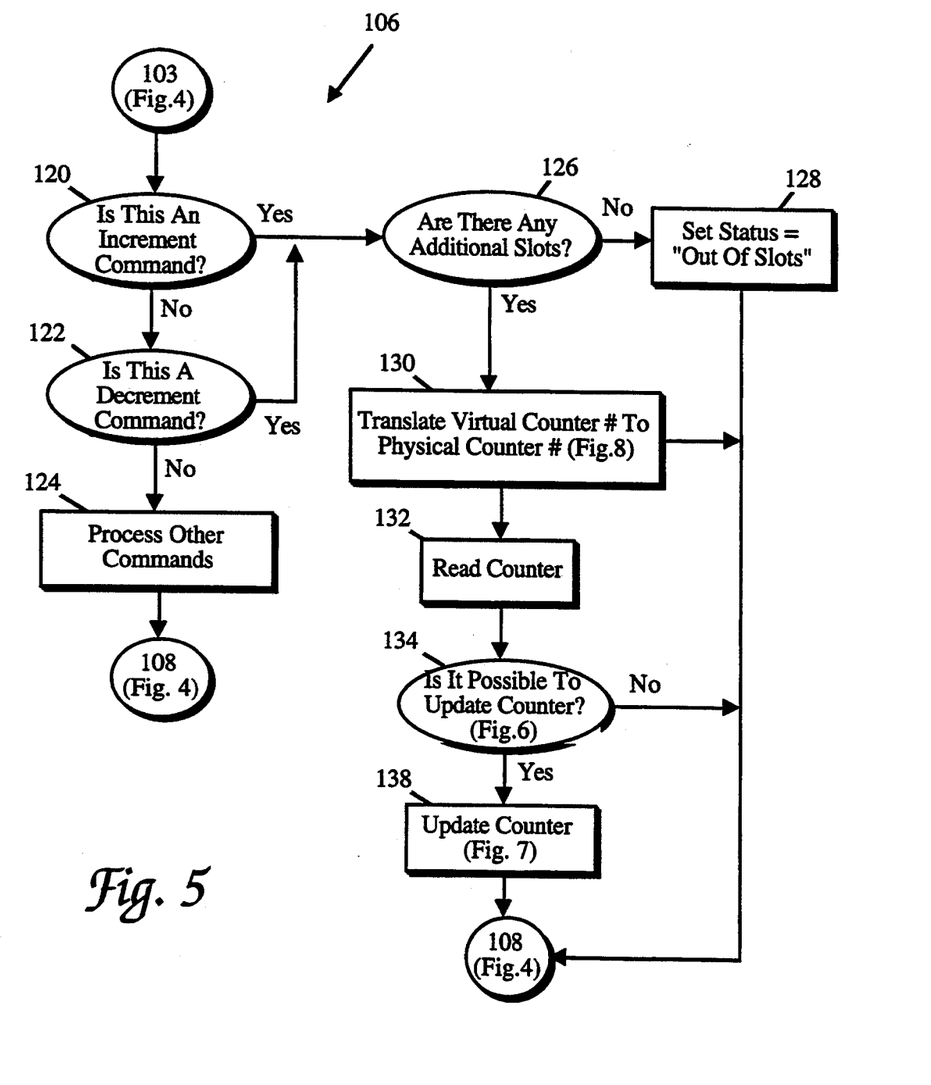
FIG. 5 is a flowchart illustrating a method of processing and executing an instruction received from the computer system (step 106 in FIG. 4) to update a counter (step 134 in FIG. 5).

Referring next to FIG. 5, the instruction processing and executing step 106 will be described in more detail. Initially, in step 120, the logic determines whether the instruction is an increment command. If so, the logic moves to step 126 where it determines whether there are any unused slots available in the meter. If not, the status is set to "out of slots" in step 128 and the logic proceeds to step 108 where a suitable message is forwarded to the host computer informing the computer of the non-existence of any additional slots. It is generally desirable not to permit the meter to continue operation in an "out of slots" situation since in the event that another counter wears out, there could be a loss of data. However, in alternative embodiments, the meter could be permitted to continue operation after informing the user of the situation.

In the normal case, additional counters will be found in step 126 and the logic will proceed to step 130. In step 130 the counter to be incremented is identified by correlating the virtual counter number carried in the instruction to a physical counter number indicative of the physical counter in the meter that is being used to store information relating to the virtual counter. This virtual to physical counter translating step will be described in more detail below with reference to FIG. 8.

If the instruction received from the computer system is not an increment command, the logic moves to step 122 where it determines whether the instruction is a decrement command. If so, the logic again moves to step 130 where it identifies the appropriate counter being accessed. If the instruction received from the computer system is not a decrement command, then the logic moves to step 124 where the instruction is processed as desired. Of course, there may be a wide variety of different instructions and commands which the meter may be programmed to respond to. For example, the system should be arranged to make it possible to return the meter's serial number and to return the update code. Further, the system can be arranged to return indications of the counter values (for monitoring purposes) and/or the status of the meter's memory partitioning. The logic then proceeds to step 108 where any suitable responses are forwarded to the host computer.

When either an increment or a decrement command has been transmitted, and the desired counter has been identified in step 130, the identified counter is read in step 132. After the counter has been read, the logic determines in step 134 whether it is possible to update the counter. This step will be described in more detail below with reference to FIG. 6. If so, the counter is updated in step 138. If not, some type of error has occurred and an indication of that error is transmitted back to the host in step 108. Alternatively, when the counter may be updated, it is first updated in step 138 and then any suitable response is returned to the host in step 108. The counter updating step 138 will be described in more detail below with reference to FIG. 7.

The described embodiment uses count down counters to monitor the metered event(s). Thus, it is contemplated that the meter will be charged to a specified level indicative of the licensed usage. The "charging" takes the form of setting the appropriate counter to the desired level. As usage occurs, it is monitored by counting down the counter, which continues to represent the amount of additional usage that will be permitted. Of course, in alternative embodiments, the counters could be count up type counters.

Figure 6:
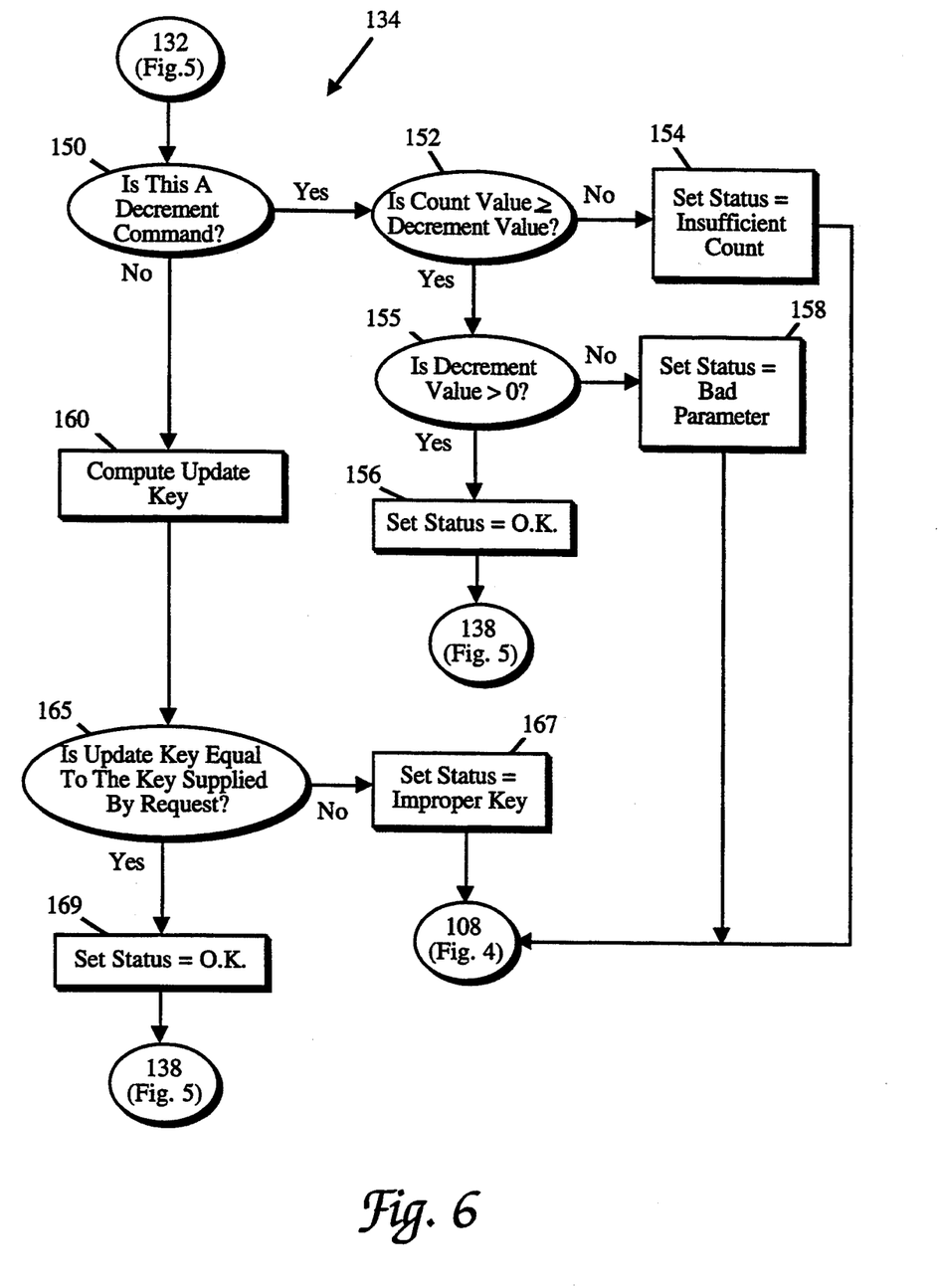
FIG. 6 is a flowchart illustrating a method of determining whether it is possible from a computer system to a meter.

The step 134 of determining whether it is possible to update the counter will be described next with reference to FIG. 6. Initially, in step 150, the logic determines whether this is a decrement command. If so, the logic moves to step 152 where it determines whether the current value stored in the counter (i.e., the count value) is greater than or equal to the value that is to be subtracted from the counter. When the counter value is greater than or equal to the amount to be subtracted, the logic moves to step 155 where it checks to make sure that the decrement value is greater than zero. That is, it checks to make sure that the amount to be subtracted from the counter is not a negative number. As long as the decrement value is a positive number, the logic moves to step 156 where the status is set to "OK" and then to step 138 where the counter is actually updated (decremented in this case). When this occurs, the meter has effectively determined that the user is authorized to perform the task being counted. On the other hand, if in step 152 the amount to be subtracted from the counter exceeds the current count value, then the user's activities are unauthorized. In this case, the status is set to an "insufficient count" indication in step 154 and the logic proceeds to step 108 where the host is informed of the fact that the action being checked by the meter is unauthorized. By way of example, as indicated above, when the meter is used to count the number of copies of a program that have been distributed, the insufficient count indicator may suggest that too many copies of the metered software have been made. In licensing applications where the user is permitted to use the application for a designated amount of time, the insufficient count indicator would indicate that their time has expired and additional time must be purchased. Of course, a variety of other licensing schemes could be implemented as well.

If in step 155 the logic determines that the decrement value is a negative number, an error has occurred or the user is attempting an unauthorized addition to the counter. In such a case, the logic proceeds to step 158 where the status is set to a "bad parameter" indication and then to step 108 where the host is informed of the problem.

If the result of the determination in step 150 is that the instruction is not a decrement command, then it must be an increment command. In this case, the user is attempting to add value to the meter. Accordingly, the logic verifies that the addition is authorized. More specifically, the logic moves to step 160 where it computes an update key. The actual algorithm used to compute the update key may be widely varied in order to ensure security. However, as indicated above, one suitable algorithm is to use the following formula:

$$Key = MD5(X)$$

Wherein "X" is the ASCII string created by concatenating the ASCII representations of the update code, the vendor seed number, the virtual counter number, the amount to be incremented, and the meter's serial number. MD5 is a well known message encryption algorithm supplied by RSA Data Security, Inc. of Redwood City, Calif. Thus the key is a function of the meter's serial number, an update code calculated by the meter after each addition, an encryption seed number provided by the vendor, the virtual counter number of the counter to be updated and the amount that the counter is to be incremented. As will be appreciated by those familiar with the software security market, a wide variety of suitable algorithms can be used to calculate the key. The important thing is that the formula not be obvious (or easily discernible) to users so that they can not readily determine the key.

After the update key has been calculated in step 160, the logic moves to step 165 where the calculated update key is compared to a control key supply by the user when the request to add to the counter is initially transmitted. As indicated above, the software developer would typically provide the appropriate control key to the user when additional time, distribution, or whatever is purchased. Accordingly, it is important that the software developer have a unit capable of computing update keys using the same algorithm as stored in the meter. If in step 165 the update key supplied in the request is found equal to the update key calculated in step 160, then the logic moves to step 169 where the status is set equal to OK and the logic proceeds to step 138 where the counter is updated. On the other hand, if in step 165 it is determined that the calculated update key is not equal the control key supplied by the request, the status is set equal to an improper key indication in step 167 and the logic proceeds to step 108 where the host is informed of the inconsistency.

Figure 7:
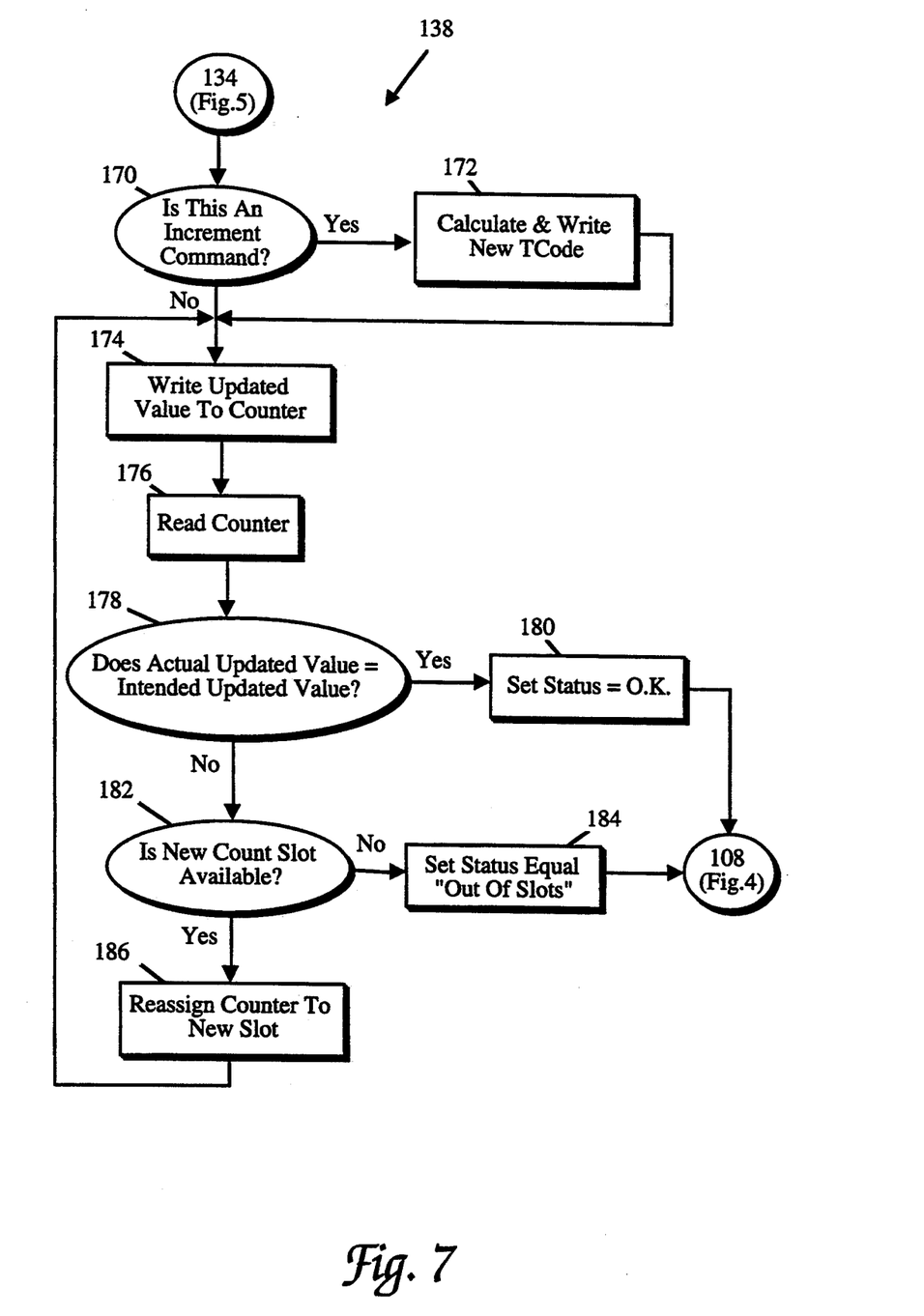
FIG. 7 is a flowchart illustrating a method of updating a counter (step 138 in FIG. 5).

Referring next to FIG. 7, the step 138 of updating a counter will be described in more detail. Essentially the counter updating step is designed to ensure that the counter has not worn out and is still capable of being updated. Initially, in step 170, the logic determines whether the instruction is an increment command. If so, the logic moves to step 172 where it calculates and writes a new update code (designated "TCODE" in the drawings). The update code can be determined in any suitable fashion. By way of example, one suitable arrangement would to make the new update code an integer that is one higher than the old update code. Another suitable formula would be to use the formula:

$$TCODE = (TCODE + 1) XOR K$$

where K is an arbitrary constant. In the described embodiment, the update code is a number. However, in alternative embodiments, the update code could be virtually any type of character string.

When the instruction is determined not to be an increment command in step 170 or after the new update code has been calculated and written in step 172, the logic proceeds to step 174 where the desired updated counter value is written to the designated counter. Thereafter, in step 176, the counter is read. The processor 30 then determines whether the actual updated value equals the intended updated value in step 178. If so, the logic moves to step 180 where the status is set to OK after which the logic proceeds to step 108 where confirmation of the completed update is transmitted to the host. On the other hand, if in step 178 it was determined that the actual updated value does not equal the intended updated value, then it is presumed that the counter has effectively worn out. In such a case, the logic moves to step 182 where it determines whether a new counter slot is available. If an additional slot is available, then the counter is reassigned to a new slot in step 186. After the counter has been reassigned, the logic returns to step 174 where the count value writing and checking steps are repeated.

When the counter is to be reassigned to a new slot, the processor 30 first determines whether the EEPROM has any empty counter slots. (in step 182). This is accomplished by comparing the next free slot number with the last slot number. If the next slot number is greater than the last slot number, then all of the slots have been used. If a slot is available, the slot number of the next available slot is written into the slot number storage location 43 that formerly held the slot number of the worn out slot in step 186. Thus, the counter is adjusted to point to a new slot which stores the actual count value. After this is done, the next free slot number is incremented. This switching of the slots that store the count value is done entirely transparently to the user. That is, there is no need for the user to know that a counter slot has worn out.

If no new counter slots are available when checking in step 182, the logic moves to step 184 where the status is set to indicate that the meter is "out of slots". Thereafter, the logic proceeds to step 108 where the host is informed of the problem. It should be understood that when the meter is effectively out of slots that it can no longer be relied on to be fault tolerant. Accordingly, the application program should be designed to inform the user that the meter has worn out and that in order to prevent the loss of important data it must be replaced. Since it will be difficult for the licensor to monitor the licensee's usage from this point on using the meter, the application program can be designed to handle such events in a variety of ways. By way of example, it may be designed to access a disk-based meter to continue the metering operation. Alternatively, it may require the replacement of the meter within a designated amount of time to prevent unauthorized use or, in extreme cases, could require the immediate replacement before the application can be used any further. Again, the software developer's use of the meter may be tailored to meet any specific need.

After the counter has been reassigned to a new slot in step 186, the logic returns to step 174 where the newly-selected slot is updated and verified in steps 174–178 as previously discussed. As long as the newly-selected slot performs satisfactorily, the metering activity continues transparently to the user. After all of the available counters have been exhausted, the user will be informed of the problem as previously discussed.

Figure 8:
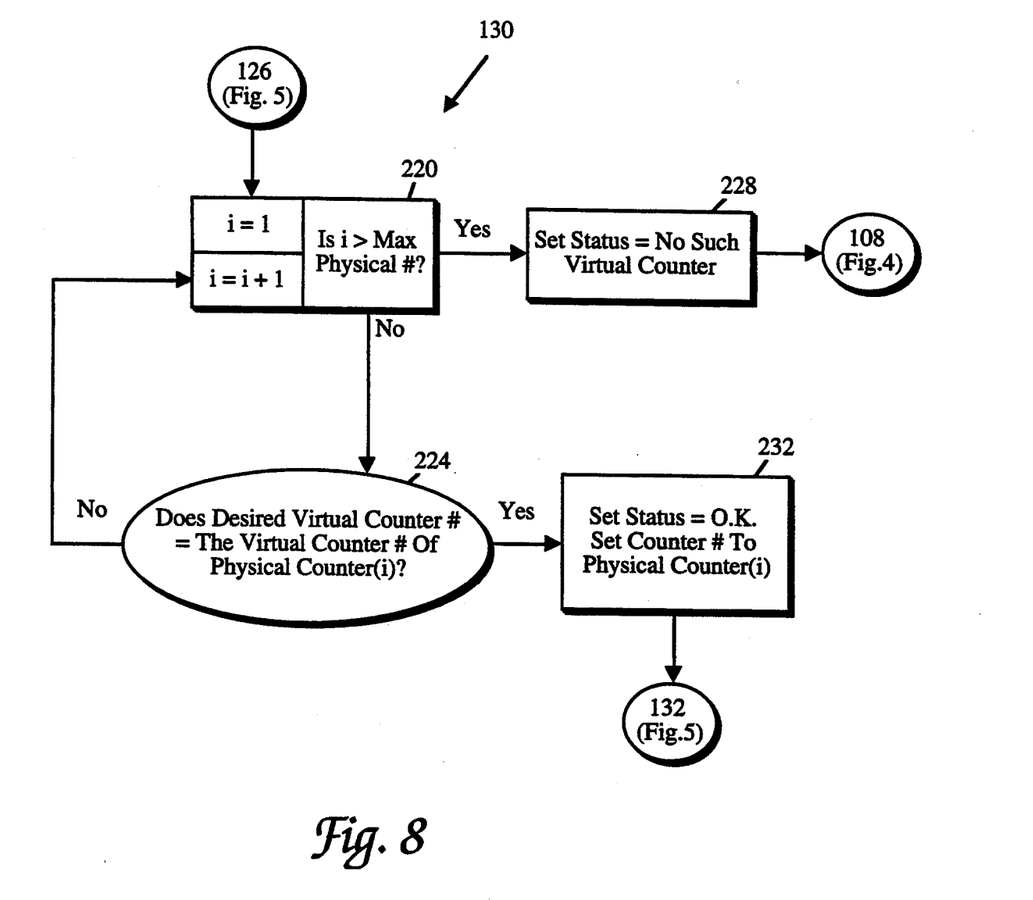
FIG. 8 is a flow diagram illustrating a method of translating a virtual counter number received from the computer system to a physical counter number in the meter (step 130 in FIG. 5).

Turning next to FIG. 8, the step 130 of translating the virtual counter number (VIRTUAL COUNTER #) to the appropriate physical counter number (PHYSICAL COUNTER #) will be described in more detail. Initially, in step 220, a counter (i) will be initialized to 1. The value of counter (i) is then compared to the value of variable MAXPHYSICAL#. So long as the value of 'I' is not greater than MAXPHYSICAL#, the logic moves to step 224 where it determines whether the desired virtual counter number is equal to the virtual counter number associated with the physical counter (i). If so, the logic moves to step 232 where status is set to OK and the counter number is set to physical counter (i). The logic then proceeds to step 132 as discussed above with reference to FIG. 5. On the other hand, if the desired virtual counter number does not equal the virtual counter number of physical counter (i), then we have not yet found the physical counter that corresponds to the desired counter. Accordingly, the logic returns to step 220 where the value of counter (i) is incremented by one and again compared to the value MAXPHYSICAL#. The loop 220–224 is then repeated until either the desired virtual counter number is found in one of the physical counter spaces or all of the physical counters have been interrogated and none correspond to the desired physical counter number. In such an instance, the value (i) exceeds the MAXPHYSICAL# in step 220, and the logic proceeds to step 228 where the status is set to "NO SUCH VIRTUAL COUNTER", and then to step 108 where the user is informed of the fact that the meter does not have a counter that corresponds to the software being operated. Of course any other lookup algorithm such as a binary tree lookup, a hash table lookup, etc. could be used to find the virtual counter in a set of physical counters.

Figure 9A:
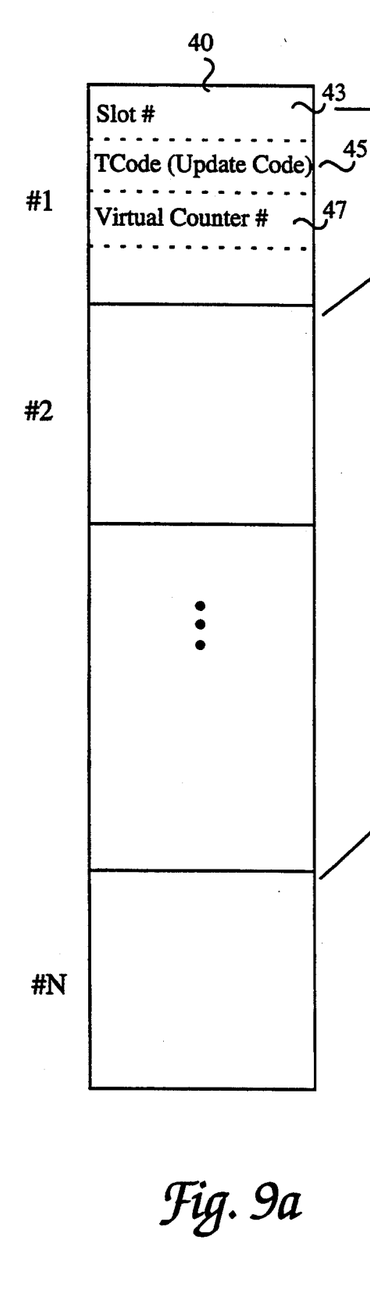
FIGS. 9a and 9b are a diagram indicating the data structure of counter memory suitable for use with the present invention.
Figure 9B:
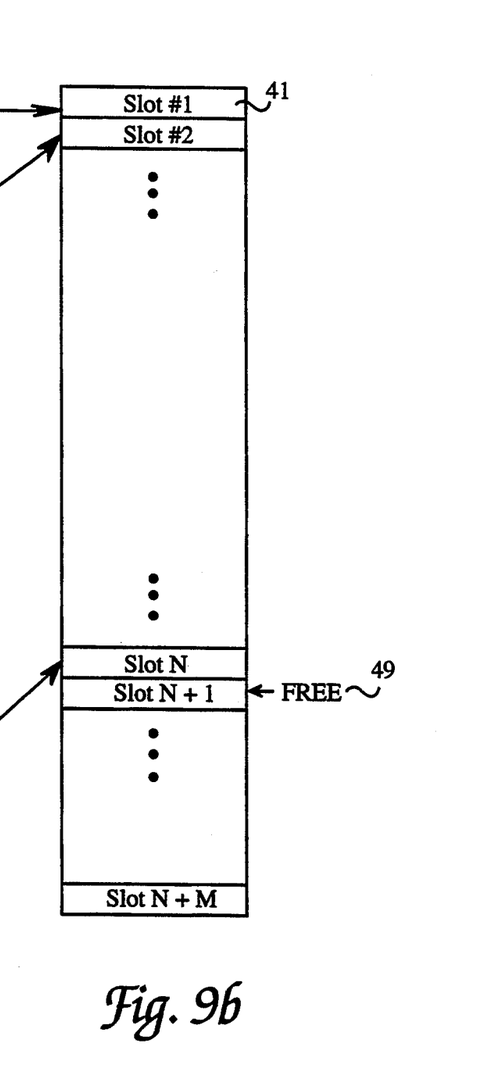

Referring next to FIGS. 9a and 9b the counter data structure will be described in more detail. The counter data structure is provided in non-volatile read/write memory 34 which in the described embodiment takes the form of EEPROM. The data structure is divided into two portions. The counter identifying portion and the slot portion. The counter identifying portion is shown in FIG. 9a. As seen therein, the counter identifying portion of the memory is divided into a multiplicity of counters 40. Each counter includes three separately accessible data storage locations. The first data storage location 43 is reserved to store the physical slot number associated with that particular counter. The second data storage location 45 is reserved to store an update code value. The third data storage location 47 is reserved to store the virtual counter number. The actual count values are stored in the slot portion of memory which is shown in FIG. 9b. The slot portion is simply a series of storage locations. The number of the physical slot that stores the count value associated with a particular counter is stored in the slot number storage location 43 of its associated physical counter. Thus, the value in slot number storage location 43 serves as a pointer.

A free slot pointer 49 is also provided to point to the next available slot in the array of slots. The size of each data storage location may be varied in accordance with the needs of a particular system. However, in the described embodiment, 32 bit values have been found to work well for each of the storage locations. It is noted that the only storage locations that are likely to suffer from memory wear out in ordinary applications are the count value storage location (slots) 41. Accordingly, as described above, only this location is specifically checked for wear out after a new value is written there into. On the other hand, if called for in a particular application, the writes to the other storage locations could be checked as well.

Although only one embodiment of the present invention has been described in detail, it should be understood that the present invention may be embodied in many other specific forms without departing from the spirit or scope of the invention. Particularly, the dongle type hardware key described can be adapted to attach to any serial or parallel port that would be suitable for a particular application. Alternatively, the entire meter could be software based, with the counters being stored on a disk or other appropriate non-volatile read/write memory. Further, the actual algorithms by which the keys and update codes are calculated can be widely varied. The embodiment described contemplates count down style counters, however, as should be appreciated by those skilled in the art, count up counters or other suitable counter arrangements can readily be substituted therefore.

Some of the method aspects of the invention can readily be applied outside the area of software metering as well. For example, the meter updating method can readily be applied to other types of meters such as postage meters and the like. Therefore, the present examples are to be considered as illustrative and not restrictive, and the invention is not to be limited to the details given herein, but may be modified within the scope of the appended claims.

I claim:

1. A software usage metering system suitable for use in conjunction with a computer system having a port, the metering system comprising:

a meter casing;

a first connector carried by the meter casing and adapted to plug into the computer system port;

a processor housed within the meter casing the processor being capable of metering a plurality of software programs;

a non-volatile read/write memory including a plurality of counters and a plurality of count slots that may be accessed by the processor, wherein each counter may be associated with a particular one of said software programs and includes a slot number storage location for a value indicative of an associated one of the count slots, and wherein the count slots are arranged to store count values indicative of the amount of use that an associated software program is permitted; and whereby when a metering signal is received from one of said metered software programs, the processor locates an associated count slot by reference to values stored in the slot number storage location and modifies the value in the associated count slot as required by the metering signal.

2. A metering system as recited in claim 1 wherein the connector is adapted to plug into a parallel port.

3. A metering system as recited in claim 1 wherein the connector is adapted to plug into a serial port.

4. A metering system as recited in claim 1 wherein the metering system is further suitable for use in conjunction with a peripheral device that may be coupled to the computer system through a peripheral cable connector that plugs into the computer system port, the metering system further comprising:
   a second connector carried by the meter casing, the second connector being complementary to the first connector and adapted to receive the peripheral cable connector; and
   means for passing signals between the first and second connectors to permit direct communication between the computer system and a peripheral that is plugged into the second connector via a peripheral cable connector.

5. A metering system as recited in claim 1 wherein the processor is arranged to verify that revisions to the value written into any of the count slots by:
   a) writing an updated value to a count slot associated with a selected counter;
   b) reading the value in the selected count slot after the updated value has been written therein;
   c) determining whether the value read from the selected count slot is equal to the updated value that was written to the selected count slot;
   d) determining whether a new count slot is available when the value read from the selected count slot is not equal to the value written to the selected count slot, and
   e) changing the value in the slot number storage location of the selected counter to a new value indicative of a new count slot when a new count slot is available and the value read from the selected count slot is not equal to the value written to the selected count slot.

6. A metering system as recited in claim 1 wherein each counter further includes a storage location for an update code.

7. A metering system as recited in claim 6 arranged to permit adding value to a selected counter in a controlled manner wherein the processor is arranged to:
   receive and identify commands to add value to the meter;
   compute an update key based on a function of a predetermined value associated with the meter, an update code associated with the counter being added to, and the amount of the value to be added to the counter;
   determine whether the computed update key is equal to a control key supplied by the external source; and
   add value to the counter only when the update key is equal to the control key.

8. A metering system as recited in claim 7 wherein the processor is further arranged to calculate and save a new update code after value has been added to the meter.

9. A method of remotely adding value to a software usage meter capable of metering the amount of use that a plurality of associated software programs are permitted, wherein the software usage meter includes a plurality of counters each having an associated counter number, a selected one of the counters being arranged to store a value, indicative of the amount of value in the meter that is to be added to, the method comprising the steps of:
   supplying a control key to the software usage meter for a selected software program that corresponds to the selected counter;
   using an on-site means associated with the meter to receive and identify an add value command that is input by the user;
   computing an update key based on a function of an update code, the counter number of the selected counter, and a preset value;
   determining whether the update key is equal to the control key; and
   adding value to the meter only when the update key is equal to the control key.

10. A method as recited in claim 9 wherein the update key is further calculated as a function of the amount to be added to the counter.

11. A method as recited in claim 9 wherein value may be added to the selected counter by incrementing the counter.

12. A method as recited in claim 9 wherein value may be added to the selected counter by decrementing the counter.

13. A method as recited in claim 9 wherein the counter number is a virtual counter number.

14. A method as recited in claim 9 further comprising the step of calculating and saving a new update code after value has been added to the software usage meter.

15. A method as recited in claim 14 wherein the preset value is the device serial number.

16. A method as recited in claim 14 wherein the preset value is a vendor seed number.

17. A method as recited in claim 14 wherein the preset value is a combination of a vendor seed number and a serial number.

18. A method of remotely adding value to a software meter associated with a computer system, wherein the meter is capable of metering the use of a plurality of software applications, the meter including a plurality of counters and a multiplicity of count slots, each counter having a virtual counter storage location for storing a virtual counter number, and a slot number storage location for storing a value indicative of an associated one of the count slots and wherein the count slots are arranged to store count values indicative of the amount of use that an associated software program is permitted, the method comprising the steps of:
   supplying a control key to the meter to facilitate adding value to a particular one of the counters associated with a selected software program that is monitored by the software usage meter;
   using an on-site processor associated with the meter to receive and identify an add value command that is input by the user and determine which of the counters is to have value added thereto based at least in part upon a virtual counter number associated with the selected software program;
   computing an update key based on a function of an update code, the amount to be added to the counter, a preset value, the virtual counter number associated with the selected software and the slot number of the count slot containing the count value associated with the selected software;

determining whether the update key is equal to the control key;

adding value to the meter only when the update key is equal to the control key; and calculating and saving a new update code after value has been added to the meter.

19. In a software metering system having non-volatile memory with a plurality of counters, each counter being arranged to store a count value indicative of a user's usage of selected software, a method of insuring that the metering system does not lose its count values due to memory wear out, the method comprising the steps of:

a) determining an updated value to be written into a selected counter;

b) writing the updated value to the selected counter;

c) reading the selected counter after the updated value has been written to the selected counter;

d) determining whether the value read from the selected counter is equal to the updated value that was written to the selected counter; and e) when the value read from the selected counter is not equal to the value written to the selected counter, determining whether a new counter is available, wherein when at least one additional counter is available, the selected counter is reassigned to an available second counter and the process of steps (b)–(e) is repeated using the second counter.

20. A method as recited in claim 19 wherein the non-volatile memory is part of a disk drive located in a computer system that is running the metered software.

21. A method as recited in claim 19 wherein the non-volatile memory is located in a metering device attached eternally to the computer system that is running the metered software.

22. A method as recited in claim 19 wherein when no additional counters are available, the user is informed that the meter is unable to continue its metering function.

23. A software usage metering system suitable for use in conjunction with a computer system having a port, the metering system comprising:

a meter casing;

a first connector carried by the meter casing and adapted to plug into the computer system port;

a processor housed within the meter casing the processor being capable of metering a plurality of software programs;

a non-volatile read/write memory including a plurality of counters and a plurality of count slots that may be accessed by the processor, wherein each counter may be associated with a particular one of said software programs and includes a slot number storage location for a value indicative of an associated one of the count slots, a storage location for an update code and a storage location for a virtual counter number;

wherein the count slots are arranged to store count values; and whereby when a metering signal is received from one of said metered software programs, the processor locates an associated count slot by reference to values stored in the slot number storage location and modifies the value in the associated count slot as required by the metering signal.

24. A metering system as recited in claim 23 wherein the processor is arranged to:

receive a designated virtual counter number indicative of selected software to be metered;

check the counters to determine whether the designated virtual counter number matches the value stored in any of the virtual counter number storage locations;

when a match is found, set a counter number variable to the counter number associated with the counter for which a match is found; and when no match is found indicate that the meter does not have a counter that corresponds to the software to be metered.

25. A metering system as recited in claim 23, operated according to the following method to insure that none of the counters lose their count values due to memory wear out, the method comprising the steps of:

a) determining an updated value to be written into a selected count slot associated with a selected counter;

b) writing the updated value to the selected count slot;

c) reading the selected count slot after the updated value has been written to the selected count slot;

d) determining whether the value read from the selected count slot is equal to the updated value that was written to the selected count slot;

e) when the value read from the selected count slot is not equal to the value written to the selected count slot, determining whether a new count slot is available, and wherein when at least one additional count slot is available, an available second count slot is assigned to the selected counter and the process of steps (b)–(e) is repeated using the second count slot.

26. A metering system as recited in claim 25 wherein when no additional count slot is available, the user is informed that the meter is unable to continue its metering function.

27. A method of determining which of a plurality of counters in a software meter is associated with a piece of software to be metered, the method comprising the steps of:

receiving a designated virtual counter number indicative of the software to be metered;

checking a series of counters each having an associated slot number location and an associated virtual counter number location to determine whether the designated virtual counter number matches the value stored in any of the virtual counter number locations;

when a match is found, setting a counter number variable to the first counter slot number for which a match was found; and when no match is found indicating that the meter does not have a counter that corresponds to the software to be metered.

* * * * *